(12) United States Patent
Saitoh

(10) Patent No.: US 6,662,659 B2
(45) Date of Patent: Dec. 16, 2003

(54) ACCELERATION SENSOR

(75) Inventor: Masakatsu Saitoh, Yokohama (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/357,408

(22) Filed: Feb. 4, 2003

(65) Prior Publication Data
US 2003/0150269 A1 Aug. 14, 2003

(30) Foreign Application Priority Data

Feb. 12, 2002 (JP) ........................................ 2002-033696

(51) Int. Cl.[7] .............................................. G01P 15/09
(52) U.S. Cl. ................................................. 73/514.34
(58) Field of Search .......................... 73/514.33, 514.34

(56) References Cited
FOREIGN PATENT DOCUMENTS
JP          63-169078        7/1988

Primary Examiner—Richard A. Moller
(74) Attorney, Agent, or Firm—Sughrue Mion, PLLC

(57) ABSTRACT

A microminiature and thin semiconductor acceleration sensor with high sensitivity is provided. The acceleration sensor has a mass portion formed in a center part of a silicon semiconductor substrate, a frame formed at a perimeter portion of the substrate, thin elastic support arms, which are provided at upper part of the mass portion and the frame and connect the mass portion and the frame, and a plurality of pairs of piezoresistors disposed on top surface sides of the elastic support arms. At least one of the mass portion and the thick frame has a cross section vertical to a respective top surface, spreading in width from the respective top surface toward a respective bottom surface. Since a side length of the mass portion and/or a width of the frame at a site, where the elastic support arms each is connected, are made short, the elastic support arm is made long, hereby the sensitivity of the sensor is enhanced.

18 Claims, 8 Drawing Sheets

ANGLES OF SIDE WALLS AND INSIDE WALLS WITH BOTTOMS (DEGREES)

LENGTH OF ELASTIC SUPPORT ARMS

ACCELERATION SENSOR

BACKGROUND OF THE INVENTION

1. Field of the Invention

The present invention relates to an acceleration sensor for detecting acceleration, which is used for toys, automobiles, aircrafts, portable terminals and the like, and particularly to an acceleration sensor that can be produced using a semiconductor technology.

2. Description of the Related Art

Acceleration sensors utilizing a change in physical quantity such as a piezo resistance effect and a change in electrostatic capacity have been developed and commercialized. These acceleration sensors can be widely used in various fields, but recently, such small-sized acceleration sensors as can detect the acceleration in multi-axial directions at one time with high sensitivity are demanded.

Since silicon single crystal becomes an ideal elastic body due to the extreme paucity of lattice defect and since a semiconductor process technology can be applied for it without large modification, much attention is paid to a piezo resistance effect type semiconductor acceleration sensor in which a thin elastic support portion is provided at a silicon single crystal substrate, and the stress applied to the thin elastic support portion is converted into an electric signal by a strain gauge, for example, a piezo resistance effect element, to be an output.

As a conventional triaxial acceleration sensor, there is the one disclosed in, for example, Japanese Laid-Open Patent No. 63-169078, and its plan view is shown in FIG. 11, and a sectional view taken along the XII—XII line in FIG. 11 is shown in FIG. 12, and a perspective view is shown in FIG. 13. The acceleration sensor 200 has elastic support arms 230 each of a beam structure, constituted by a thin portion of a silicon single crystal substrate. A mass portion 220 in a center, which is constituted by a thick portion of a silicon single crystal substrate, and a frame 210 in a periphery thereof are connected by the elastic support arms 230. A plurality of strain gauges 240 are formed in each axial direction on the elastic support arms 230.

An entire structure will be explained, referring to FIG. 11, FIG. 12 and FIG. 13. The sensor 200 has the mass portion 220 constituted by the thick portion of the silicon single crystal substrate, a frame 210 placed to surround the mass portion 220, and two pairs of elastic support arms 230 in a beam form, which are perpendicular to each other and each constituted by the thin portion of the silicon single crystal substrate to bridge the mass portion 220 and the frame 210. When the acceleration works, the mass portion moves in the frame to deform the elastic support arms, and thus the deformation is detected by the strain gauges provided on the elastic support arms to obtain the acceleration that works. The acceleration in an X-axis direction in FIG. 11 is measured by the four strain gauges 240 provided on the elastic support arms extending in the X-axis direction, and the acceleration in a Y-axis direction is measured by the four strain gauges 240 provided on the elastic support arms extending in the Y-axis direction. The acceleration in a Z-axis direction is measured by means of all the strain gauges 240. By making four L-shaped through-holes 250 in the silicon single crystal substrate having the size of the frame 210, the mass portion 220 in the center, the frame 210 in the periphery and the support arms 230 bridging them are formed, and by making the support arm portions thin, the acceleration sensor is constructed to be deformable and highly sensitive.

In the above-described acceleration sensor, to enhance sensitivity, it is effective to increase the volume of the mass portion 220 to increase the mass, or to increase the length of the elastic support arms 230, and as is generally well-known, the sensitivity increases substantially in proportion to the mass of the mass portion and the length of the support arms. That is, the volume of the mass portion 220 is increased, or the length of the elastic support arms 230 are increased, whereby the elastic support arm 230 becomes more deformable and the stress can be effectively transmitted to the strain gauges, thus enhancing sensitivity. However, increasing the mass portion 220 and increasing the length of the elastic support arms 230 are mutually contradictory, and both of them are not mutually compatible especially under the condition that the chip size is kept constant, or when reduction in size is planned. That is, if the mass portion 220 is made larger, the length of the elastic support arms 230 becomes smaller, and a great deal of improvement in sensitivity cannot be improved. Thus, glass pieces and the like are bonded on the back surface of the mass portion 220 in assembly process to increase the volume (that is, weight) of the mass portion 220, whereby the sensitivity is enhanced. The length of the elastic support arms 230 cannot be made large, while the chip is made larger in the thickness direction (the thickness direction of the silicon single crystal substrate), whereby the mass of the mass portion 220 is increased to enhance the sensitivity. Accordingly, it is conventionally impossible to realize a compact and thin acceleration sensor with high sensitivity.

SUMMARY OF THE INVENTION

The present invention is accomplished in view of the above-described circumstances, and its object is to solve the above-described problem and provide a compact and thin acceleration sensor capable of enhancing sensitivity.

In order to solve the above-described problem, the present invention adopts an acceleration sensor as follows. That is, the acceleration sensor of the present invention comprises a mass portion provided in a center; a thick frame surrounding the mass portion with a predetermined distance from the mass portion; a plurality of elastic support arms extending from an edge of a top surface of the mass portion, bridging the top surface edge of the mass portion and an inside edge of a top surface of the thick frame and hanging the mass portion inside of the thick frame; and a plurality of strain gauges disposed on the elastic support arms. The mass portion has the top surface, a bottom surface opposite to the top surface and a plurality of side walls surrounding the mass portion between the top surface and the bottom surface of the mass portion. The thick frame has the top surface, a bottom surface opposite to the top surface and inside walls on inside surfaces, facing the mass portion, of the thick frame between the top surface and the bottom surface of the thick frame.

The acceleration sensor is made of a silicon single crystal wafer, preferably a SOI (Silicon-on-insulator) wafer, and can be constructed to have a thick-walled frame with its plane shape being substantially a square, a mass portion which is provided at a center of the thick-walled frame and is formed to be substantially a square, and four elastic support arms which connect centers of sides of the square on the top surface of the mass portion and centers of inner sides of the thick-walled frame in a square shape which is on the top surface of the thick frame. In the acceleration sensor made of a silicon single crystal wafer or a SOI wafer, the top surface of the thick-walled frame, the top surface of the mass portion and the top surfaces of the four elastic support arms are formed by using the surface of one side of the wafer, and therefore they are on substantially the same surface. A bottom surface of the thick-walled frame and a bottom surface of the mass portion are formed by using a surface of the other side of the wafer, and therefore they are on substantially the same surface. The elastic support arm is formed to be thin by being cut by etching or the like from the surface of the other side of the wafer, and therefore when it is made of the SOI wafer, it is formed of a remaining $SiO_2$ layer, or a laminated product of the $SiO_2$ layer and a silicon layer.

In the acceleration sensor of the present invention, at least either of the mass portion or the thick-walled frame expands in its width from the top surface toward the bottom surface, in the cross section perpendicular to its top surface. When the cross section perpendicular to the top surface of the square mass portion expands in the width from the top surface to its bottom surface, one side of the square on the bottom surface is longer than one side of the square on the top surface. When the vertical cross section of the thick-walled frame expands in its width from its top surface to its bottom surface, the width of the bottom surface is longer than the width of the top surface of the thick-walled frame. It is preferable that in the acceleration sensor of the present invention, the mass portion extends in the width from the top surface toward the bottom surface in the cross section perpendicular to its top surface, and the thick-walled frame expands in the width from its top surface toward its bottom surface in the cross section perpendicular to its top surface.

The dimension of the mass portion and/or the thick-walled frame on the top surfaces is made small and the dimension on the bottom surfaces is made large, whereby the length of the elastic support arm can be made larger without reducing the mass of the mass portion, therefore making it possible to increase sensitivity with which acceleration is detected. If the dimension of the mass portion and the thick-walled frame on their top surfaces is made small and the dimension on their bottom surfaces is made large, the elastic support arms can be extended on the side of the mass portion and on the side of the thick-walled frame. Alternatively, as for only one of the mass portion and the thick-walled frame, the dimension on the top surface can be made small and the dimension on the bottom surface can be made large. However, when the dimension of one of them is changed, it is preferable to apply the present invention to the mass portion side. If the dimension of the thick-walled frame on its top surface is made small and the dimension on its bottom surface is made large, a kind of notch is formed in a portion of the thick-walled frame at which the elastic support arm is attached. If the dimension on its top surface is made extremely smaller as compared with the dimension on its bottom surface, the notch formed at the portion of the thick-walled frame at which the elastic support arm is attached is deepened, which causes the fear of reducing mechanical strength of a base supporting the elastic support arm.

Expressing the acceleration sensor of the present invention in other words, on at least one of each side wall of the mass portion and each inner wall of the thick-walled frame, the angle, which is formed by a plane passing through the place on the wall at which the elastic support arm is attached and the intersection line of the wall and the bottom surface corresponding to the wall, and the bottom surface corresponding to the wall, is 80 degrees or larger and smaller than 90 degrees. Preferably, the angle, which is formed by the plane passing through the place on the wall, at which the elastic support arm is attached, on each side wall of the mass portion and passing the intersection line of the wall and the bottom surface corresponding to the wall, and the bottom surface corresponding to the wall, is 80 degrees or larger and smaller than 90 degrees, and the angle, which is formed by a plane passing through a place on the wall at which the elastic support arm is attached on each of the inner wall of the thick-walled frame and passing the intersection line of the wall and the bottom surface corresponding to the wall, and the bottom surface corresponding to the wall, is 80 degrees or larger and smaller than 90 degrees.

Further expressing the acceleration sensor of the present invention in other words, the angle, which is formed by at least one of each side wall of the mass portion and each inner wall of the thick-walled frame, and the bottom surface corresponding to the wall, is 80 degrees or larger, and smaller than 90 degrees. Preferably, the angle, which is formed by each side wall of the mass portion, and the bottom surface corresponding to the wall, is 80 degrees or larger and smaller than 90 degrees, and the angle, which is formed by each of the inner walls of the thick-walled frame and the bottom surface corresponding to the wall, is 80 degrees or larger and smaller than 90 degrees.

DETAILED DESCRIPTION OF THE PREFERRED EMBODIMENTS

Figure 1:
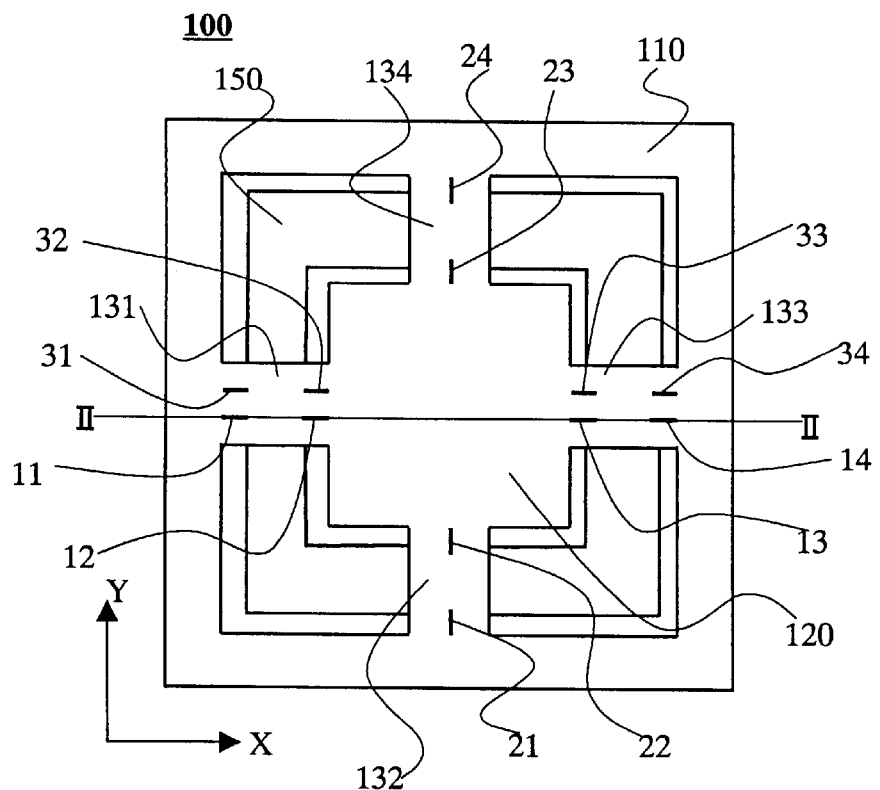
FIG. 1 is a plan view showing an acceleration sensor of EXAMPLE of the present invention.
Figure 2:
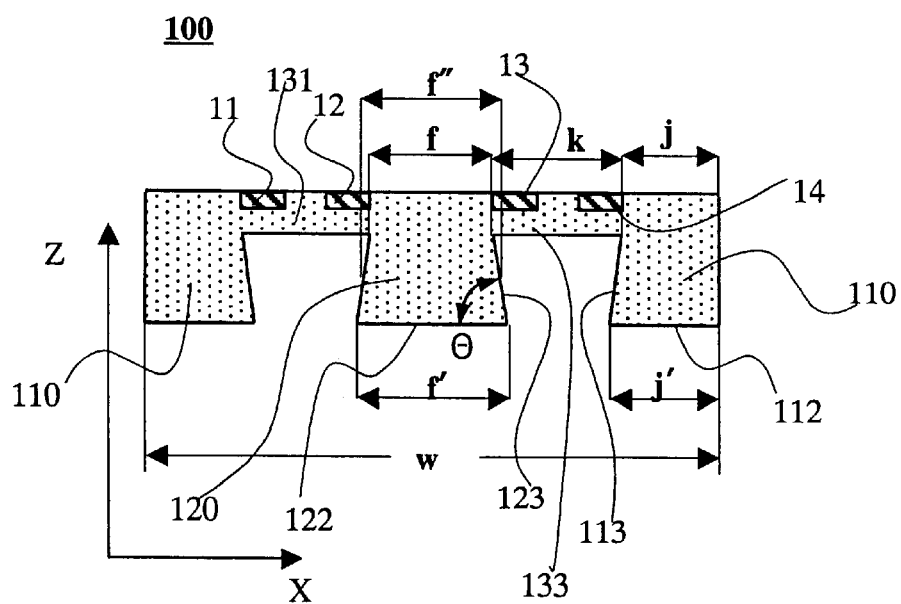
FIG. 2 is a sectional view of the acceleration sensor in FIG. 1 taken along the II—II line in FIG. 1.

An acceleration sensor of an EXAMPLE of the present invention will be explained with reference to FIGS. 1 and 2. FIG. 1 is a plan view of the acceleration sensor. FIG. 2 is a sectional view taken along the line II—II in FIG. 1.

The acceleration sensor of the present invention uses a silicon single crystal substrate with a SOI layer being formed via a SiO₂ insulation layer, namely, a SOI wafer, in order to make it possible to control the thickness of elastic support arms with high precision. The SOI is an abbreviation of a Silicon On Insulator. In this example, a wafer formed by thinly forming the SiO₂ insulation layer being an etching stopper (about 1 μm) on an Si wafer with thickness of about 625 μm, on which an N-type silicon single crystal layer with thickness of about 10 μm is formed, is used as a substrate. In an accelerator sensor 100 of the EXAMPLE, four L-shaped through-holes 150 in a square-shaped silicon single crystal substrate of the same size as a frame 110 are made, whereby a mass portion 120 in a center, a thick-walled frame 110 around it, and support arms placed between them are formed, and by making the portions of the support arms thin to make elastic support arms 131, 132, 133 and 134. The acceleration sensor 100 has distortion gauges (in the explanation below, a "piezoresistor" as an example of a distortion gauge is used, and therefore they are called "piezoresistors") 11, 12, . . . , 33, 34, which are placed on the elastic support arms to be corresponding to two perpendicular detection axes (axes X and Y) and a detection axis (axis Z) perpendicular to a top surface of the acceleration sensor, with four distortion gauges for each axis. Namely, on the elastic support arms 131 and 133 extending in the X-axis direction, pairs of piezoresistors 11 and 12, and 13 and 14 are provided respectively to detect acceleration in the X-axis direction. Pairs of the piezoresistors 21 and 22, and 23 and 24 are provided respectively on the elastic support arms 132 and 134 extending in the Y-axis direction to detect acceleration in the Y-axis direction. Further, pairs of piezoresistors 31 and 32, and 33 and 34 are provided respectively on the elastic support arms 131 and 133 extending in the X-axis direction to detect acceleration in the Z-axis direction. In this example, the acceleration in the Z-axis direction is detected with the piezoresistors provided on the elastic support arms 131 and 133, but the element detecting the acceleration in the Z-axis direction may be provided on the elastic support arms 132 and 134. The four piezoresistors for detecting the acceleration in each axis direction construct separate full bridge detection circuits.

Mainly referring to FIG. 2, a shape of a section perpendicular to a top surface of the acceleration sensor will be explained. In the acceleration sensor 100, the sectional shape of the mass portion 120 and the sectional shape of the thick-walled frame 110 are gradually expanding from a top surface where the elastic support arms 131 and 133 are connected toward a bottom surface with an angle θ. Since a side wall 123 of the mass portion and an inner wall 113 of the thick-walled frame, which opposes to the mass portion, each have the angle θ with respect to the bottom surfaces 122 and 112, the length of the elastic portions 131 and 133 can be made longer.

For explanation, in FIG. 2, a length of one side of an outer frame 110 of the acceleration sensor is w, a length of a side of the mass portion 120 on its top surface is f, a length of the side on its bottom surface is f', a length of the side at intermediate height is f", a length of each of the elastic support arms 131 and 133 is k, a width of the thick-walled frame 110 on its top surface is j, and the width on its bottom surface is j'. The one side of the thick-walled frame w is the total of the side length f of the top surface of the mass portion 120, the length twice as long as the elastic support arm length k, and the width twice as long as the width j on the top surface of the frame portion. Since the side wall 123 of the mass portion extends at a certain angle with respect to the bottom surface 122, f<f"<f' holds good, and since the inner wall 113 of the thick-walled frame 110 extends at a certain angle with respect to the bottom surface 112, j<j' holds good.

If the length f' of the side at the bottom surface of the mass portion 120 is fixed, the side wall 123 of the mass portion has an angle θ with respect to the bottom surface 122, and thereby the length f of the side on the top surface of the mass portion becomes short. If the lower surface width j' of the thick-walled frame 110 is fixed, the inner side wall 113 of the thick-walled frame has the angle θ with respect to the bottom surface 112, and thereby the width j on the bottom surface of the thick-walled frame becomes short. If the length w of the one side of the thick-walled frame of the acceleration sensor is fixed, the side wall of the mass portion and the inner wall of the frame have the angle θ with respect to the bottom surface, whereby the length f of the top surface side of the mass portion and the bottom surface width j of the frame become shorter, and therefore the length k of the elastic support arm becomes longer to that extent.

When the side wall 123 of the mass portion and the inner wall 113 of the thick-walled frame are inclined to the bottom surfaces 122 and 112 at the angle θ, the length f" of the side at the intermediate height of the mass portion is fixed so as to keep the mass of the mass portion 120 substantially the same as the mass in the case where the side wall 123 is not inclined. And the side wall 123 of the mass portion 120 is inclined with an end of the side at the intermediate height as the center to shorten the length f of the top surface side of the mass portion and increase the length f' of the bottom surface side of the mass portion. Even if the inner wall 113 is inclined and the volume of the thick-walled frame 110 is changed, it does not influence the detection sensitivity of the acceleration sensor, and therefore the inner wall 113 is inclined while the bottom surface width j' of the thick-walled frame is fixed to form the angle θ with respect to the bottom surface 112. When the side wall 123 of the mass portion 120 and the inner wall 113 of the thick-walled frame 110 are inclined at the angle θ with respect to the bottom surfaces 122 and 112, the length f of the top surface side of the mass portion and the top surface width j of the thick-walled frame become smaller, and therefore even if the side length w of the frame of the acceleration sensor is fixed, the length k of the elastic support arms 131 and 133 becomes longer to that extent.

Figure 3:
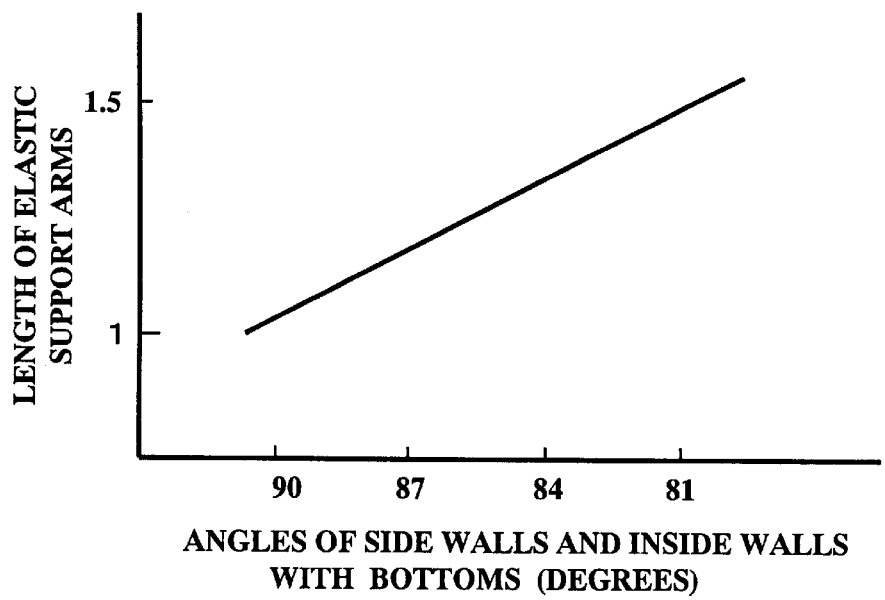
FIG. 3 is a graph showing a relationship between length of elastic support arms and angles of side walls and inside walls with bottoms in the acceleration sensor of the present invention.
Figure 4:
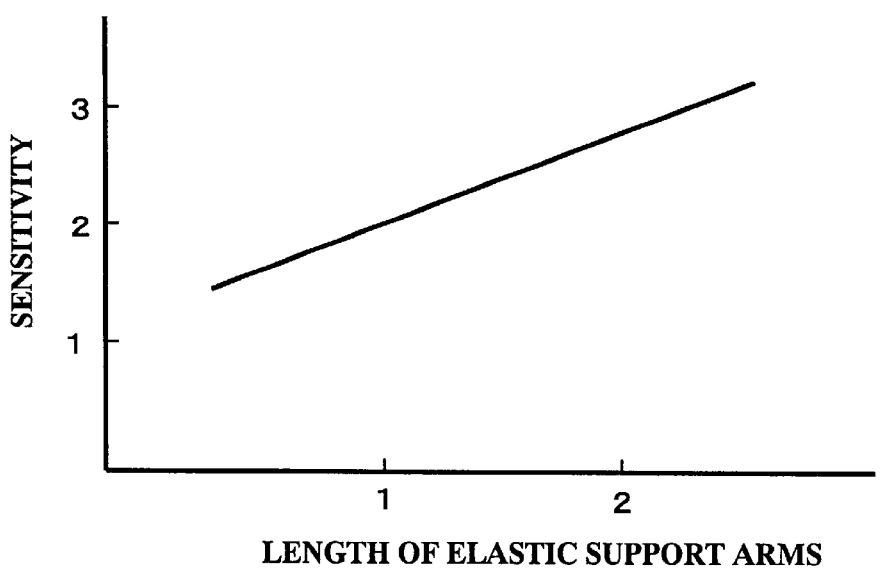
FIG. 4 is a graph showing a relationship between sensitivity and length of elastic support arms of the acceleration sensor of the present invention.

FIG. 3 shows the relationship between the length of the elastic support arm (relative value) and the angle θ of inclination of the side wall and the inner wall with respect to their bottom surfaces when the angle θ at which the side wall of the mass portion and the inner wall of the thick-walled frame are each inclined with respect to their bottom surfaces is changed from 90 degrees to 81 degrees in the acceleration sensor that is made with use of a silicon wafer of the thickness of 625 μm. In the acceleration sensor made with use of the silicon wafer of the thickness of 625 μm, the thickness of the elastic support arm on its top surface is about 10 μm, and therefore the height of the mass portion and the thick-walled frame becomes substantially 625 μm. Thus, when the inclined angle θ with respect to the bottoms of the side wall and the inner wall is made smaller to 84 degrees, the length of the elastic support arm can be made longer by about 130 μm if the bottom surface side length of the mass portion is fixed. If the length k of the elastic support arm of the acceleration sensor, in which the side wall of the mass portion and the inner wall of the thick-walled frame are perpendicular to their bottom surfaces, is assumed to be 400 μm, the length of each elastic support arm becomes about 1.3 times. The influence of the length of the elastic support arm on the sensitivity of the acceleration sensor is proportional to the length of the elastic support arm as shown in FIG. 4. In this EXAMPLE, the length of the elastic support arm can be increased by 30%, and therefore the detection sensitivity can be improved by about 30%.

When the side length is fixed at the intermediate height of the mass portion and the mass portion side wall is inclined with the side end as the center to make the angle θ with respect to its bottom surface small to 84 degrees to fix the mass of the mass portion, the length of the elastic support arm can be made longer by about 100 μm. If the length k of the elastic portion is 400 μm when the side wall is perpendicular, the length of each of the elastic support arm becomes about 1.25 times.

In the above explanation, the side wall of the mass portion and the inner wall of the frame are inclined at the same angle, but it is natural that the angle of the side wall of the mass portion and the angle of the inner wall of the thick-walled frame can be made different, and if they are made different, the aforementioned effect of the present invention can be also obtained.

It is preferable that the side wall of the mass portion and the inner wall of the frame are each inclined at the angle of 80 degrees or more and less than 90 degrees. It is difficult to make the angle of inclination smaller than 80 degrees in forming the side wall by dry etching. If the angle of inclination is made smaller than 80 degrees, a notch formed between the elastic support arm and the side wall at the portion of the side wall where the elastic support arm is attached is deepened, and the mechanical strength may reduce at that portion. It is obviously preferable to make the angle of inclination smaller than 90 degrees, and it is further preferable to make it smaller than 88 degrees. If it is made smaller than 88 degrees, the length of the elastic support arm is increased by 1.1 times.

The function of the piezoresistors provided at the elastic support arms will be explained here. The elastic support arms 131 and 133 extending in the X-axis direction are provided with the piezoresistors 11 and 12, and 13 and 14 for measuring the acceleration in the X-axis direction. The elastic support arms 132 and 134 extending in the Y-axis direction are provided with the piezoresistors 21 and 22, and 23 and 24 for measuring the acceleration in the Y-axis direction. The elastic support arms 131 and 133 extending in the X-axis direction are also provided with the piezoresistors 31 and 32, and 33 and 34 for measuring the acceleration in the Z-axis direction.

Figure 5:
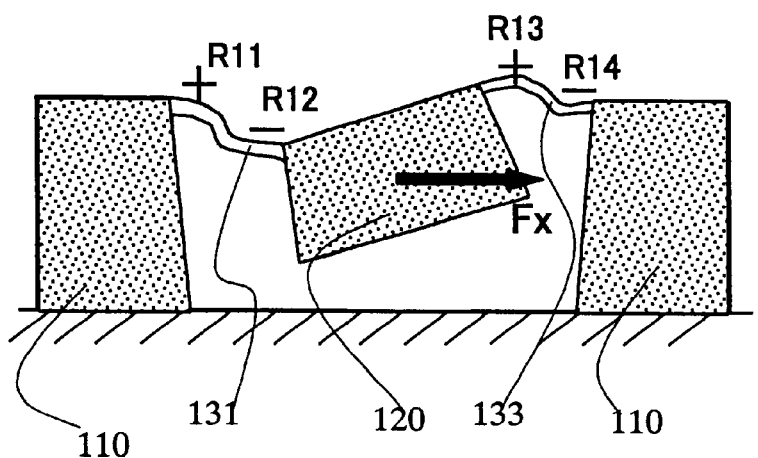
FIG. 5 is a schematic view explaining deformation of the acceleration sensor when acceleration works in an X-axis (Y-axis) direction.
Figure 6:
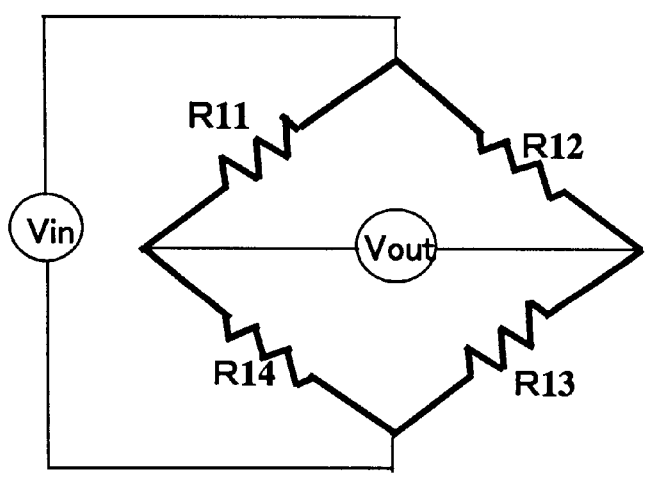
FIG. 6 shows an example of a bridge circuit for measuring acceleration in the X-axis (Y-axis) direction.
Figure 7:
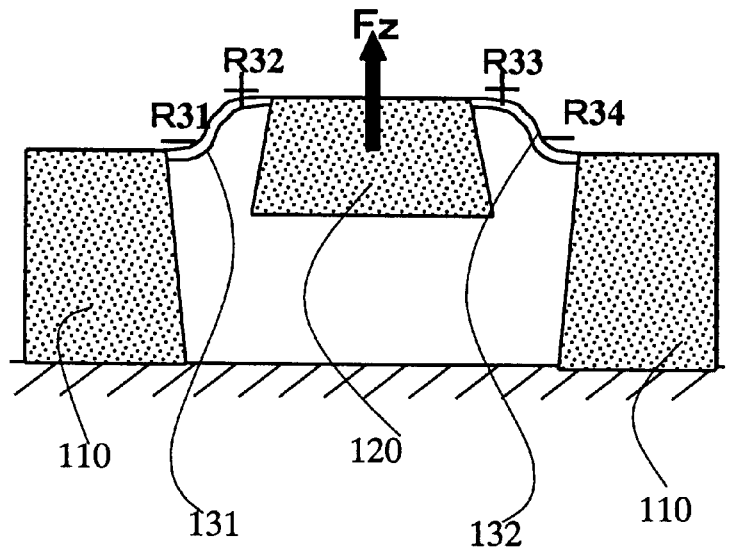
FIG. 7 is a schematic view explaining deformation of the acceleration sensor when acceleration works in a Z-axis direction.

When the acceleration in the X-axis direction is exerted on the mass portion 120, a force Fx works on the center of gravity of the mass portion 120, and therefore as shown in FIG. 5, the left side of the top surface of the mass portion 120 tilts downward and the right side of the top surface thereof tilts upward. As a result, the piezoresistor 11 on the elastic support arm 131 extends, and the piezoresistor 12 contracts. Since, in the circuit in FIG. 6, the resistance of the piezoresistor 11 is expressed as R11 and that of the piezoresistor 12 as R12, the resistors 11 and 12 are expressed as R11 and R12, respectively, in FIG. 5 for convenience of understanding and extension and contract of the resistors are shown by "+" and "−", respectively. In FIGS. 5 and 7, similar expressions are used. The piezoresistor 13 on the elastic support arm 133 extends, and the piezoresistor 14 contracts. Since the piezoresistors extend and contract like this, the resistances R11, R12, R13 and R14 are changed. When the resistances of the piezoresistors are combined to be a full bridge circuit and a constant voltage Vin is applied thereto as shown in FIG. 6, the change in the resistances of the piezoresistors can be measured according to an output Vout. As for the acceleration in the Y-axis direction, the elastic support arm extending in the Y-axis direction may be considered in the same manner as in the X-axis direction.

Figure 8:
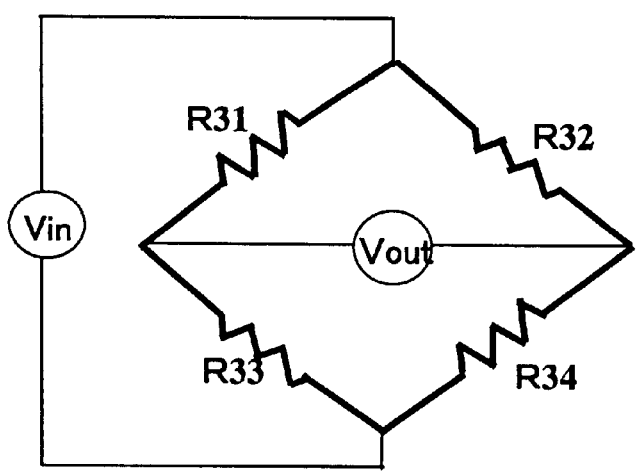
FIG. 8 shows an example of a bridge circuit for measuring acceleration in the Z-axis direction.

When the acceleration in the Z-direction is exerted on the mass portion 120, a force Fz works, and the left and right sides of the top surface of the mass portion 120 move upward as shown in FIG. 7. As a result, the piezoresistor 31 on the elastic support arm 131 contracts, and the piezoresistor 32 extends. In the same manner, the piezoresistor 33 on the elastic support arm 133 extends and the piezoresistor 34 contracts. When the resistances R11, R12, R13 and R14 of the piezoresistors are combined to be a full bridge circuit and a constant voltage Vin is applied thereto as shown in FIG. 8, the change in the resistances of the piezoresistors can be measured according to the output Vout. It is suitable to change the wire connection of the resistances in the bridge circuit for detecting the acceleration in the Z-axis direction from that in the bridge circuit for detecting the acceleration in the X-axis direction, and therefore other piezoresistors are used.

A production method of the acceleration sensor of EXAMPLE will be explained below. FIGS. 9A through 9E show part (left half) of a section in the X-axis direction (II—II section) in FIG. 1 to explain a main process. As described above, an SOI wafer is a Si single crystal substrate constructed with a Si base substrate 60, an SOI layer 80 on the top surface, which is a Si active layer, and a $SiO_2$ layer 70, which is between the Si base substrate 60 and the SOI layer 80, and is used as an etching stopper, as denoted by reference numerals in FIG. 9A. As for the thickness thereof, the base substrate 60 has thickness of 625 μm, $SiO_2$ layer has thickness of 1 μm and the SOI layer has thickness of about 10 μm.

Figure 9A:
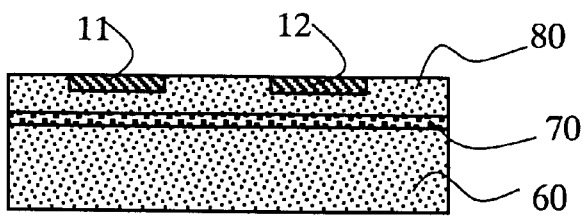
FIGS. 9A through 9E are explanatory views of a production process of the acceleration sensor of EXAMPLE of the present invention.

The first step of the production process is to make a pattern of a predetermined form with a photoresist or thermally oxidized $SiO_2$ film or the like on the surface of the SOI layer 80 and to make piezoresistors 11 and 12 with boron being diffused by an impurity diffusion process such as ion implantation (FIG. 9A). As surface impurity density, about $2 \times 10^{18}$ atoms/cm$^3$ is adopted, from the viewpoint of both the temperature characteristics and sensitivity.

Figure 9B:
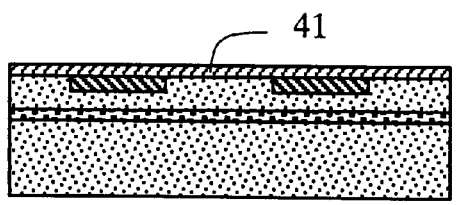

Next, to protect the piezoresistors 11 and 12, a protection film 41 is produced (FIG. 9B). As the protection film 41, a multilayer film of $SiO_2$ and PSG (Phosphorous silicated glass) that are generally used in a semiconductor technology are used to have a gettering effect of movable ion. Instead of the two-layer film of $SiO_2$ and PSG, a two-layer film of $SiO_2$ and SiN may be used. It is preferable that the thickness of the protection film 41 is made as thin as possible to decrease stress in terms of high sensitivity, and therefore it is made 0.3 μm to 0.5 μm.

Figure 9C:
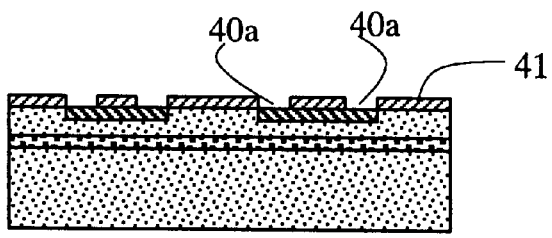

Next, through-holes 40a for connecting electrodes are formed in the protection film 41 on both ends of the piezoresistors 11 and 12 by a wet etching with hydrofluoric acid as a predominant ingredient (FIG. 9C).

Figure 9D:
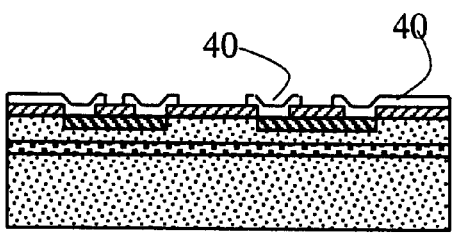

Next, to make electrode wiring, a film of aluminum alloy (aluminum, copper, silicon and the like are main ingredients) is formed by spattering. The thickness is 0.3 μm to 0.5 μm. Lead electrodes 40 are formed by photo etching (FIG. 9D).

Next, though not shown, the SOI layer 80 is etched by a dry etching method or the like to form a through-hole pattern 150 to the thin portion shown in FIG. 1.

Figure 9E:
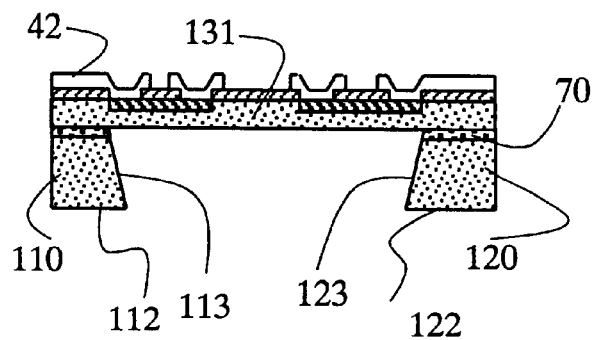
Figure 10A:
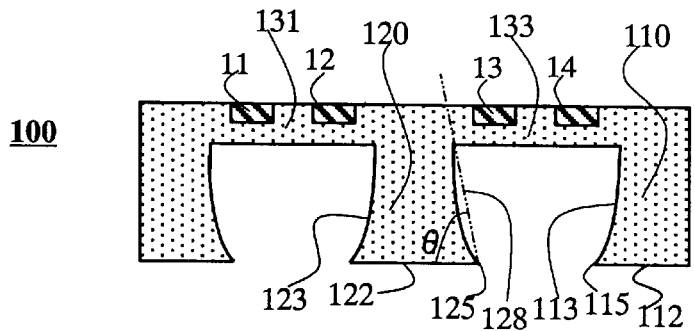
FIGS. 10A through 10D are sectional views of acceleration sensors according to other EXAMPLES of the present invention.
Figure 10B:
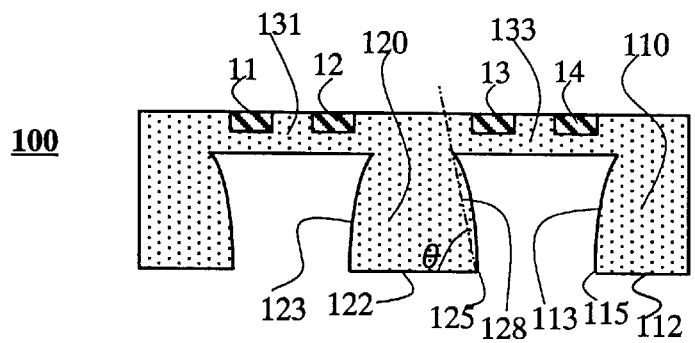
Figure 10C:
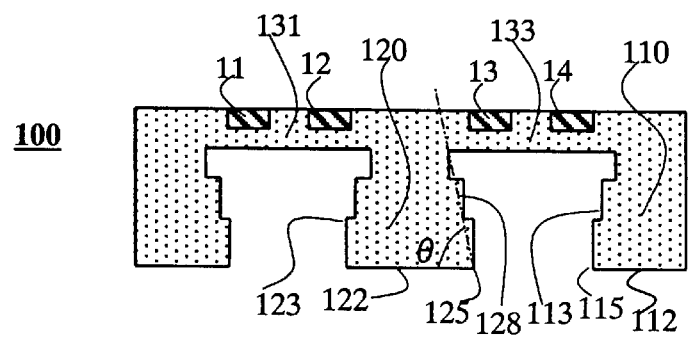
Figure 10D:
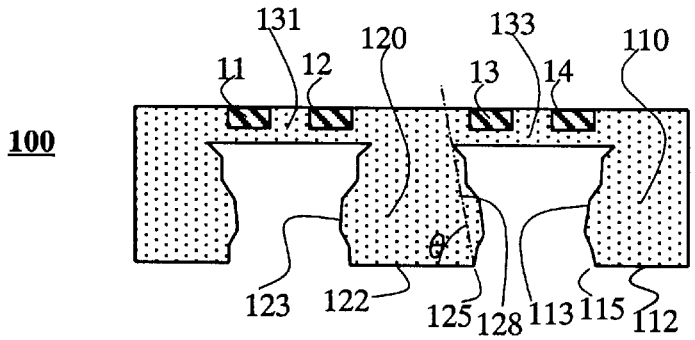
Figure 11:
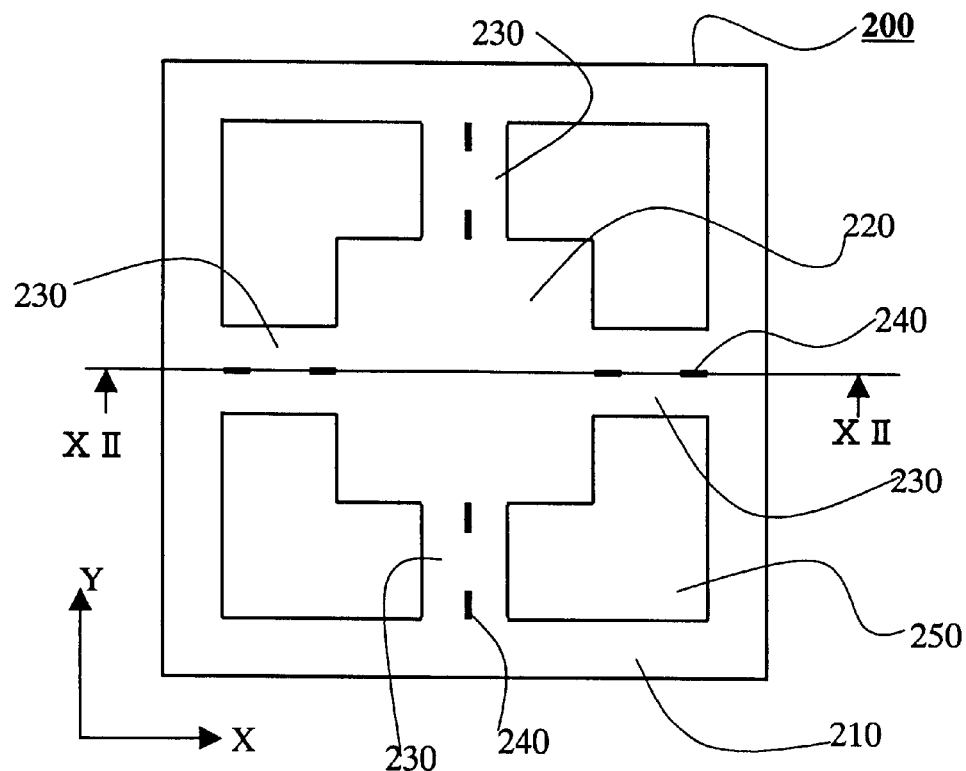
FIG. 11 is a plan view showing an acceleration sensor disclosed in a Japanese Laid-Open Patent.
Figure 12:
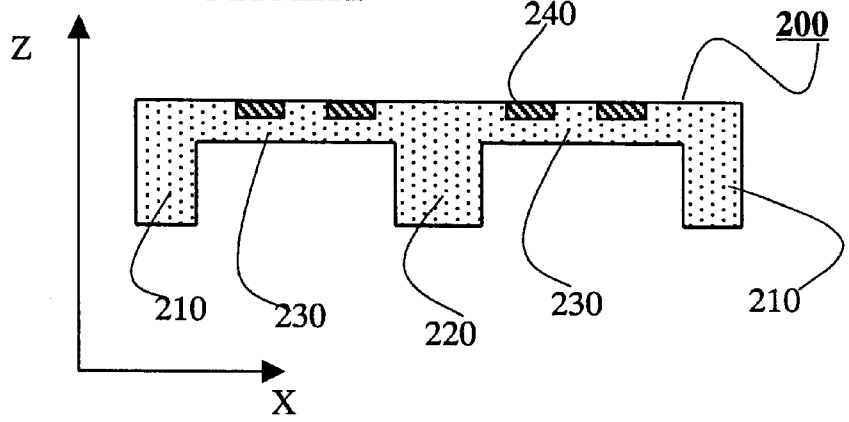
FIG. 12 is a sectional view of the acceleration sensor in FIG. 11 taken along the XII—XII line in FIG. 11.
Figure 13:
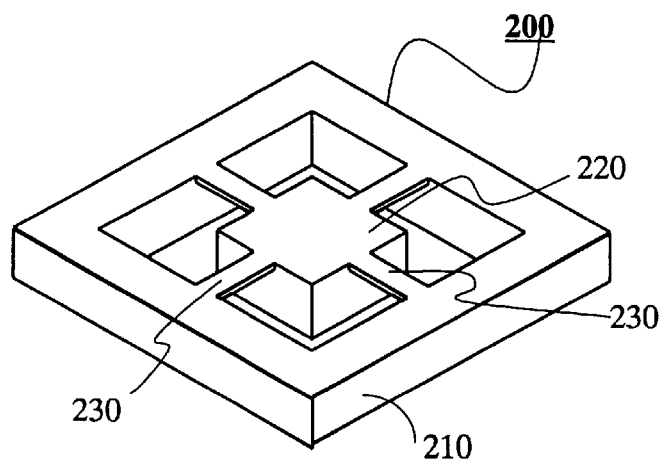
FIG. 13 is a perspective view of the acceleration sensor in FIG. 11.

Next, on the base substrate 60 on the back surface a photoresist mask is formed in the shapes of the mass portion 120 and the frame 110 with the positions of the piezoresistors 11 and 12 on the surface, the through-hole pattern 150 to the SOI layer 80 and the like are aligned with use of a double-side aligner device, the base substrate 60 is etched by the dry etching method, and the $SiO_2$ layer 70 as the etching stopper is removed by wet etching (FIG. 9E). In the dry etching step, an etching process mainly using $SF_6$-gas and a process adhering polymer mainly containing $C_4F_8$-gas on the side walls and the inside walls are repeated alternately. As an etching solution to etch the $SiO_2$ layer, buffered hydrofluoric acid is used. Although the elastic support arms 131, 132, 133 and 134 are formed in the dry etching process, in some cases it is preferable to leave the $SiO_2$ layer 70 as the etching stopper without removing it in order to keep balance of the entire stress, forming a lamination of the $SiO_2$ layer and the silicon layer as the elastic support arms, and part of the $SiO_2$ layer 70 may be left as the etching stopper on the back side of the elastic support arms.

Thereafter, a number of acceleration sensor elements formed on the wafer are cut into sensor chips one by one with use of a dicer or the like, and via the assembly process such as packaging and the like, the semiconductor acceleration sensor is completed.

According to the acceleration sensor of the present invention, it is possible to increase the length of the elastic support arm by about 1.3 times while keeping the volume of the mass portion 120 at the center without changing the chip size, whereby the sensitivity of the sensor can be improved by about 30%.

The acceleration sensor according to another embodiment of the present invention is shown in the sectional view in FIGS. 10A through 10D. The same reference numerals and symbols are used to show the same parts as in the aforementioned embodiment. In the acceleration sensor 100 shown in FIG. 10A, the mass portion side wall 123 and the frame side wall 113 are formed to have a concave curved surface. In the acceleration sensor 100 shown in FIG. 10B, the mass portion side wall 123 and the frame inner wall 113 are formed to have a convex curved surface. In the acceleration sensor 100 shown in FIG. 10C, the mass portion side wall 123 and the frame inner wall 113 are formed to be in a stepped shape. In the acceleration sensor 100 shown in FIG. 10D, the mass portion side wall 123 and the frame inner wall 113 are formed to have a multi-curved surface.

Even if the side walls 123 and 113 of the mass portion 120 and the thick frame 110 are in the shape with projections and depressions as shown in FIGS. 10A through 10D, it is suitable if only the angle θ, which is formed by a plane (for example, 128) passing a place on the side wall 123 or the inner wall 113 at which the elastic support arms 131 and 133 are attached and the intersection lines 125 or 115 of the side wall 123 or the inner wall 113 and the corresponding bottom surfaces 122 or 112, and the bottom surface 122 or 112 is 80 degrees to 90 degrees.

As explained thus far, as the result that the cross section of the mass portion or the thick-walled frame is made larger on the bottom surface side than the top surface side which is connected to the elastic support arm, the length of the elastic support arm can be made larger even if the frame dimension is the same, and the volume of the mass portion can be made larger, thus making it possible to provide the compact and thin acceleration sensor with high sensitivity.

What is claimed is:

1. An acceleration sensor, comprising:
   a mass portion provided in a center of the acceleration sensor and having a top surface and a bottom surface opposite to the top surface;
   a thick frame surrounding the mass portion with a predetermined distance from the mass portion and having a top surface and a bottom surface opposite to the top surface;
   a plurality of elastic support arms each extending from an edge of the top surface of the mass portion, bridging the top surface edge of the mass portion and an inside edge of the top surface of the thick frame and hanging the mass portion inside of the thick frame; and
   a plurality of strain gauges disposed on the elastic support arms,
   wherein at least one of the mass portion and the thick frame has a cross section vertical to the respective top surface spreading in width from the respective top surface toward the respective bottom surface.

2. An acceleration sensor as set forth in claim 1, wherein the mass portion has a cross section vertical to its top surface spreading in width from its top surface toward its bottom surface and the thick frame has a cross section vertical to its top surface spreading in width from its top surface toward its bottom surface.

3. An acceleration sensor as set forth in claim 1, wherein the acceleration sensor is made of silicon single crystal.

4. An acceleration sensor as set forth in claim 1, wherein the acceleration sensor is made of an SOI wafer and the plurality of elastic support arms are constituted by a $SiO_2$ layer or a lamination of a $SiO_2$ layer and a silicon layer.

5. An acceleration sensor as set forth in claim 2, wherein the acceleration sensor is made of silicon single crystal.

6. An acceleration sensor as set forth in claim 2, wherein the acceleration sensor is made of an SOI wafer and the plurality of elastic support arms are constituted by a $SiO_2$ layer or a lamination of a $SiO_2$ layer and a silicon layer.

7. An acceleration sensor, comprising:
   a mass portion provided in a center of the acceleration sensor and having a top surface, a bottom surface opposite to the top surface and a plurality of side walls surrounding the mass portion between the top surface and the bottom surface;
   a thick frame surrounding the mass portion with a predetermined distance from the mass portion and having a top surface, a bottom surface opposite to the top surface and inside walls on inside surfaces, facing the mass portion, of the thick frame between the top surface and the bottom surface of the thick frame;
   a plurality of elastic support arms each extending from an edge of the top surface of the mass portion, bridging the top surface edge of the mass portion and an inside edge of the top surface of the thick frame on the inside wall of the thick frame and hanging the mass portion inside of the thick frame; and
   a plurality of strain gauges disposed on the elastic support arms,
   wherein on at least one of each of the side walls of the mass portion and each of the inside walls of the thick frame, a plane passing a site, at which each of the elastic support arms is connected on the wall, and an intersection line between the wall and a bottom surface corresponding to the wall is at an angle of 80 degrees or more to 90 degrees with the bottom surface corresponding to the wall.

8. An acceleration sensor as set forth in claim 7, wherein on each of the side walls of the mass portion, a plane passing a site, at which each of the elastic support arms is connected on the wall, and an intersection line between the wall and a bottom surface corresponding to the wall is at an angle of 80 degrees or more to 90 degrees with the bottom surface corresponding to the wall, and on each of the inside walls of the thick frame, a plane passing a site, at which each of the elastic support arms is connected on the wall, and an intersection line between the wall and a bottom surface corresponding to the wall is at an angle of 80 degrees or more to 90 degrees with the bottom surface corresponding to the wall.

9. An acceleration sensor as set forth in claim 7, wherein at least one of each of the side walls of the mass portion and each of the inside walls of the thick frame is at an angle of 80 degrees or more to 90 degrees with a bottom surface corresponding to the wall.

10. An acceleration sensor as set forth in claim 9, wherein each of the side walls of the mass portion is at an angle of 80 degrees or more to 90 degrees with a bottom surface corresponding to the wall and each of the inside walls of the thick frame is at an angle of 80 degrees or more to 90 degrees with a bottom surface corresponding to the wall.

11. An acceleration sensor as set forth in claim 7, wherein the acceleration sensor is made of silicon single crystal.

12. An acceleration sensor as set forth in claim 7, wherein the acceleration sensor is made of an SOI wafer and the plurality of elastic support arms are constituted by a $SiO_2$ layer or a lamination of a $SiO_2$ layer and a silicon layer.

13. An acceleration sensor as set forth in claim 8, wherein the acceleration sensor is made of silicon single crystal.

14. An acceleration sensor as set forth in claim 8, wherein the acceleration sensor is made of an SOI wafer and the plurality of elastic support arms are constituted by a $SiO_2$ layer or a lamination of a $SiO_2$ layer and a silicon layer.

15. An acceleration sensor as set forth in claim 9, wherein the acceleration sensor is made of silicon single crystal.

16. An acceleration sensor as set forth in claim 9, wherein the acceleration sensor is made of an SOI wafer and the plurality of elastic support arms are constituted by a $SiO_2$ layer or a lamination of a $SiO_2$ layer and a silicon layer.

17. An acceleration sensor as set forth in claim 10, wherein the acceleration sensor is made of silicon single crystal.

18. An acceleration sensor as set forth in claim 10, wherein the acceleration sensor is made of an SOI wafer and the plurality of elastic support arms are constituted by a $SiO_2$ layer or a lamination of a $SiO_2$ layer and a silicon layer.

* * * * *